United States Patent [19]
Breuner

[11] 3,870,251
[45] Mar. 11, 1975

[54] AUTOGYRO
[76] Inventor: Gerald L. Breuner, 50 Milady Ln., Orinda, Calif. 94563
[22] Filed: Mar. 20, 1974
[21] Appl. No.: 452,712

Related U.S. Application Data
[63] Continuation-in-part of Ser. No. 329,076, Feb. 2, 1973, abandoned.

[52] U.S. Cl. ................ 244/17.21, 244/8, 416/123, 416/170
[51] Int. Cl. ............................................ B64c 27/02
[58] Field of Search ........... 244/17.21, 17.19, 17.11, 244/6, 7 R, 7 A, 8; 416/123, 129, 170; 74/417, 420

[56] References Cited
UNITED STATES PATENTS
2,547,255  4/1951  Bruel .............................. 244/17.19
2,596,363  5/1952  Breguet ............................. 416/170
3,582,022  6/1971  Robinson ......................... 244/17.21

FOREIGN PATENTS OR APPLICATIONS
1,511,006  1/1968  France ............................... 416/123

Primary Examiner—Trygve M. Blix
Assistant Examiner—Galen L. Barefoot
Attorney, Agent, or Firm—Robert H. Eckhoff

[57] ABSTRACT
This invention relates to an improved design for autogyros. It involves a more desirable layout of cockpit/engine placement than heretofore thought of. It provides for improved efficiency, visibility and balance and solves some of the problems of recent autogyros. The aforementioned advantages are achieved by placing the engine aft of the cockpit and by further arranging a gear box forward of said engine. The gear box is so arranged that it drives a propeller, located between the gear box and the engine, and a rotor located above the cockpit.

3 Claims, 3 Drawing Figures

PATENTED MAR 11 1975 3,870,251

AUTOGYRO

This application is a continuation-in-part of my application Ser. No. 329,076 filed Feb. 2, 1973, now abandoned.

BACKGROUND OF THE INVENTION

Autogyros have been known since 1923; however, one has not yet been produced that reaches the full potential of the machine. This invention is a move in the direction of extracting the full potential of such an aircraft. Speed, simplicity, noise reduction, balance, engine cooling, lowered center of gravity, and visibility are objects of this invention.

SUMMARY OF THE INVENTION

The design layout proposed by this invention seems, at first glance, similar to other autogyros of recent manufacture, such as the Air and Space, the Avian, and the McCulloch in that the pilot and passenger cabin is forward for visibility and the engine is to the rear of the pylon. This invention is similar to that extent but has important unique differences beyond the two points mentioned. The cabin remains forward for visibility. This is especially important during landing as the autogyro lands at a high angle of attack such that visibility during landing of the old type tractor autogyro was less than desirable. The engine in the present invention is installed in the rear, but as a tractor rather than a pusher as in the aforementioned autogyros. The location of the engine behind the pylon remains the same, the direction of engine thrust is changed from pusher to puller by mounting the engine 180° to the placement used in the previously mentioned autogyros.

This placement has several very important advantages. First, the engine can be closely cowled and still have adequate cooling as the engine is in the slipstream of the propeller. This has been a problem in this type of slow moving aircraft where a pusher installation has been used. Previous solutions have resulted in augmentors and reduction in streamlining. Another advantage to a forward facing rear mounted engine is engine noise reduction in the cabin. The engine is farther removed from the cabin and the noise is further carried away in the propeller slipstream. A further advantage is the reduction of fire hazard from an engine mounted in the rear. A further advantage is that the propeller remains closer to the pylon where the height profile under the rotor is at its greatest as the possible height and length profile of the fixed structure to the rear of the autogyro pylon is limited by operational necessity. Having the propeller ahead of the engine and closely behind the pylon allows more latitude in engine placement for balance of the cabin area. It also allows for greater area behind the propeller for vertical stabilizers. A forward facing engine behind the pylon also allows direct power take-off from the engine propeller shaft forward to the rotor prerotator drive mechanism. It also allows for a lower mounted engine and propeller as the propeller is over the main landing gear. The necessary structure required to connect the cabin, rotor, landing gear, engine and stabilizers can incorporate a duct for the propeller for more efficient thrust.

DESCRIPTION OF THE PREFERRED EMBODIMENT

Figures 1, 3:
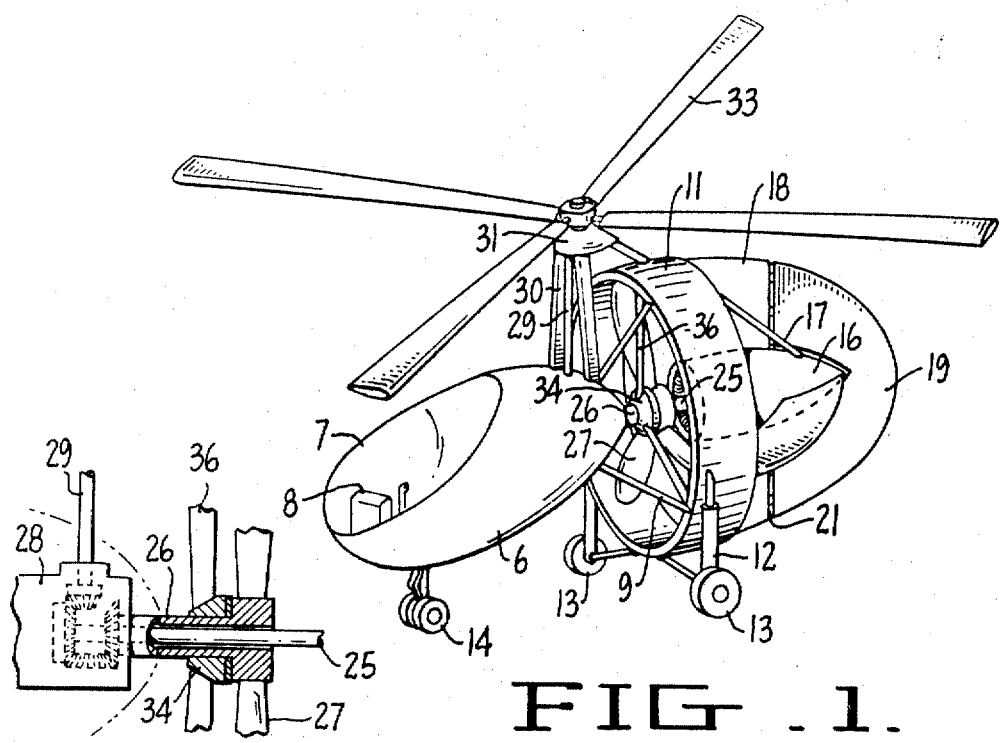
FIG. 1 is a perspective view of an autogyro embodying the present invention.
FIG. 3 is a fragmentary view, partly in section, showing the relation between the drive shaft 25 to the gear box 28 and the concentric annular shaft 25 surrounding the shaft 25 for rotating the propeller 27.
Figure 2:
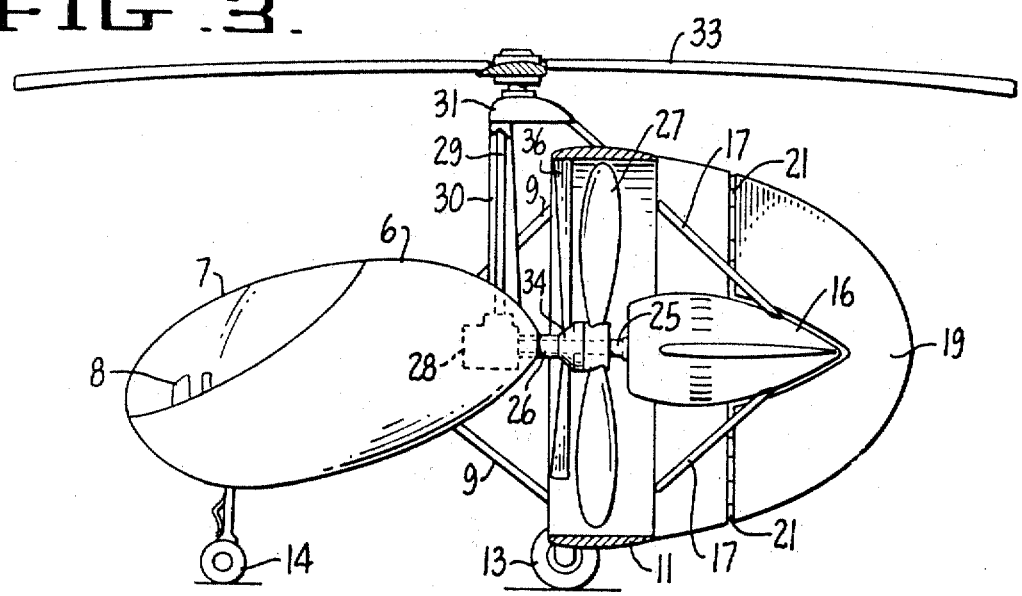
FIG. 2 is a side elevation, partly in section, of the preferred design layout of the autogyro.

The autogyro includes a cabin, generally indicated at 6, having a windshield 7 at its forward end. Controls 8 are provided in the cabin. Attached to the cabin by struts 9 is an annular duct 11 supported while on the ground on a framework, generally indicated at 12, the latter having landing wheels 13. Forward landing wheels 14 are provided beneath the cabin to provide three point suspension for the autogyro. An engine 16 is supported by struts 17 from the duct 11. Also supported from the duct and extending vertically is stabilizer fin 18 upon which a rudder 19 is mounted by means of hinge 12, the rudder being moved by suitable controls in the cabin 6 to alter the direction of forward motion of the autogyro. Shaft 25 extends forwardly from the engine 16 to a gear box and clutch arrangement 28 to transmit the rotary motion of the shaft 25 to a vertically extending shaft 29, the upper end of which is supported in a housing 31 mounted on a pylon 30 and having a multibladed rotor 33 mounted above the pylon. Hollow shaft 26, concentric with shaft 25, extends rearwardly from the gear box 28 and carries the multibladed propeller 27 which rotates in the duct 11. The shaft 26 is supported in bearing hub 34 centrally of duct 11 by struts 36 from the duct 11.

From the foregoing, I believe it will be apparent that the numerous advantages I have heretofore pointed out are inherent in the construction which I have disclosed.

I claim:

1. An autogyro comprising a cabin,
   a tubular duct supported on the cabin rearwardly thereof and in spaced relation thereto,
   an engine supported within the duct in substantial axial alignment therewith and spaced from the cabin,
   a propeller located between the engine and the cabin,
   a rotatable first shaft extending forwardly from the engine and driven by the engine,
   gear means connected to the first shaft forwardly of the propeller,
   a tubular shaft concentric with the first shaft and rotatable by the gear means,
   the propeller fixed on the tubular shaft for rotation therewith within the duct and between the engine and cabin,
   upright rotor support pylon means supported on the cabin,
   upright rotor drive shaft means supported by the pylon means and connected to the gear means to be rotated thereby,
   and rotor blade means fixed on the rotor drive shaft means for rotation therewith.

2. An autogyro as in claim 1, wherein the duct comprises an annular, cylindrical ring, strut means connected with the cabin and with the duct, supporting the duct in axial alignment with the cabin, other strut means connected with the duct and with the engine and supporting the engine substantially rearwardly of the duct, and stabilizer fin and rudder means supported on the duct rearwardly thereof.

3. An autogyro as in claim 2, wherein said engine comprises the only engine for operating said propeller and said rotor blade means, said rearward mounted engine resulting in improved efficiency, visibility and balance of the autogyro.

* * * * *